(12) United States Patent
Mandrychenko et al.

(10) Patent No.: US 11,032,301 B2
(45) Date of Patent: Jun. 8, 2021

(54) FORENSIC ANALYSIS

(71) Applicant: Fortinet, Inc., Sunnyvale, CA (US)

(72) Inventors: Oleksii Mandrychenko, Edinburgh (GB); Darren Hart, Edinburgh (GB); Jamie Robert Graves, Edinburgh (GB); Matthew John Little, Edinburgh (GB)

(73) Assignee: Fortinet, Inc., Sunnyvale, CA (US)

( * ) Notice: Subject to any disclaimer, the term of this patent is extended or adjusted under 35 U.S.C. 154(b) by 291 days.

(21) Appl. No.: 15/990,342

(22) Filed: May 25, 2018

(65) Prior Publication Data

US 2018/0351979 A1 Dec. 6, 2018

(30) Foreign Application Priority Data

May 31, 2017 (GB) ..................................... 1708671

(51) Int. Cl.
*H04L 29/06* (2006.01)
*G06F 16/17* (2019.01)
*G06F 21/55* (2013.01)

(52) U.S. Cl.
CPC ...... *H04L 63/1425* (2013.01); *G06F 16/1734* (2019.01); *G06F 21/552* (2013.01); *H04L 63/1416* (2013.01); *H04L 63/20* (2013.01)

(58) Field of Classification Search
CPC . H04L 63/1425; H04L 63/1416; H04L 63/20; G06F 16/1734; G06F 21/552
See application file for complete search history.

(56) References Cited

U.S. PATENT DOCUMENTS 6,742,124 B1 5/2004 Kilpatrick et al.
8,887,274 B2 11/2014 Buchanan et al.
(Continued)

FOREIGN PATENT DOCUMENTS

CN 1777119 5/2006
CN 101425936 5/2009
(Continued)

OTHER PUBLICATIONS

Hofmeyr, Steven A., et al., "Intrusion Detection using Sequences of System Calls", Journal of Computer Security, vol. 6, No. 3, Aug. 18, 1998, 25 pages.
(Continued)

*Primary Examiner* — Tri M Tran
(74) *Attorney, Agent, or Firm* — HDC Intellectual Property Law, LLP

(57) ABSTRACT

A forensic analysis method performed in respect of an endpoint device connected to a computer network. The forensic analysis method comprises collecting file system call data from the endpoint device. The file system call data corresponds to a plurality of system calls relating to file system operations arising from activity performed on the endpoint device. The forensic analysis method also comprises collecting network communication metadata from the endpoint device. The network communication metadata is based on a plurality of system calls relating to communication operations over the computer network arising from activity performed on the endpoint device. The forensic analysis method further comprises detecting first candidate data comprised in one of the collected file system call data and the collected network communication metadata and identifying second candidate data in the other of the collected file system call data and the collected network communication metadata with the second candidate data corre- (Continued)

sponding to the first candidate data. The forensic analysis method yet further comprises analysing the second candidate data to determine whether or not the first and second candidate data correspond to suspect activity performed on the endpoint device.

26 Claims, 3 Drawing Sheets

(56) References Cited

U.S. PATENT DOCUMENTS

| | | |
|---|---|---|
| 2002/0046275 A1 | 4/2002 | Crosbie et al. |
| 2002/0065695 A1 | 5/2002 | Francoeur et al. |
| 2003/0014383 A1 | 1/2003 | Cho et al. |
| 2004/0230530 A1 | 11/2004 | Searl et al. |
| 2005/0076390 A1 | 4/2005 | Klausberger et al. |
| 2005/0097366 A1 | 5/2005 | McCreight et al. |
| 2005/0262136 A1 | 11/2005 | Lloyd et al. |
| 2006/0053498 A1 | 3/2006 | Bejanin et al. |
| 2006/0064416 A1 | 3/2006 | Sim-Tang |
| 2006/0069540 A1 | 3/2006 | Krutz |
| 2006/0101413 A1 | 5/2006 | Kinno et al. |
| 2007/0107052 A1 | 5/2007 | Cangini et al. |
| 2007/0139231 A1 | 6/2007 | Walla et al. |
| 2007/0157210 A1 | 7/2007 | Inoue |
| 2007/0226170 A1 | 9/2007 | Sun |
| 2007/0261120 A1 | 11/2007 | Arbaugh et al. |
| 2007/0300301 A1* | 12/2007 | Cangini ............... G06F 21/554 726/23 |
| 2008/0065811 A1 | 3/2008 | Jahangiri |
| 2008/0120720 A1 | 5/2008 | Guo et al. |
| 2008/0186872 A1 | 8/2008 | Zaencker |
| 2008/0222717 A1 | 9/2008 | Rothstein et al. |
| 2009/0106012 A1 | 4/2009 | Liu |
| 2009/0210368 A1 | 8/2009 | Deo et al. |
| 2010/0223244 A1 | 9/2010 | Sinha et al. |
| 2010/0284288 A1 | 11/2010 | Lee et al. |
| 2011/0035804 A1 | 2/2011 | Moghe |
| 2011/0153748 A1 | 6/2011 | Lee et al. |
| 2012/0011153 A1 | 1/2012 | Buchanan et al. |
| 2014/0157407 A1* | 6/2014 | Krishnan ............... G06F 21/50 726/22 |
| 2014/0165137 A1* | 6/2014 | Balinsky ............... G06F 21/554 726/1 |
| 2014/0188840 A1 | 7/2014 | Agarwal et al. |
| 2015/0074808 A1* | 3/2015 | Quinn ............... G06F 21/554 726/23 |
| 2015/0264077 A1 | 9/2015 | Berger et al. |
| 2018/0069881 A1 | 3/2018 | Graves et al. |

FOREIGN PATENT DOCUMENTS

| | | |
|---|---|---|
| CN | 202172419 | 3/2012 |
| CN | 102420723 | 4/2012 |
| CN | 102539980 | 7/2012 |
| CN | 102664772 | 9/2012 |
| CN | 103617104 | 3/2014 |
| CN | 103744752 | 4/2014 |
| EP | 0 985 995 A1 | 3/2000 |
| IE | 920074 | 7/1992 |
| KR | 20080063952 | 7/2008 |
| WO | 2004/012063 | 2/2004 |
| WO | 2013/128428 | 9/2013 |

OTHER PUBLICATIONS

Coull, S., et al., "Intrusion detection: a bioinformatics approach", Proceedings of the 19th Annual Computer Security Applications Conference, IEEE, Dec. 8, 2003, pp. 24-33.

Coull, et al., "Sequence Alignment for masquerade detection", Computational Statistics and Data Analysis, North-Holland, Amsterdam, NL, vol. 52, No. 8, Feb. 5, 2008, pp. 4116-4131.

Wespi, A., et al., "An intrusion-detection system based on the teiresias pattern discovery algorithm", EICAR 1999, 15 pages.

Florez-Larrahondo, German, et al., Intrusion Detection Using Text Processing Techniques with a Binary-Weighted Cosine Metric, Journal of Information Assurance and Security, 2006, pp. 59-77.

Bing, Yue, et al., "An Anomaly Intrusion Detection Method Using Fourier Transform", Journal of Electronics (China), vol. 21, No. 2, Mar. 2004, pp. 135-139.

Karlin, S., et al., "Methods for assessing the statistical significance of molecular sequence features by using general scoring schemes", Proceedings of the National Academy of Sciences of USA, National Academy of Science, Washington, DC, US, vol. 87, Mar. 1, 1990, pp. 2264-2268.

Forrest, Stephanie, et al., "A Sense of Self for Unix Processes", 1996 IEEE Symposium on Security and Privacy, IEEE Computer Society Press, Los Alamitos, CA, pp. 120-128 (1996).

Forrest, S., et al., "Self-Nonself Discrimination in a Computer", Proceedings of 1994 IEEE Symposium on Research in Security and Privacy (in press), 11 pages.

Schafer, Andreas, "International Search Report", for PCT/GB2009/051142, dated Dec. 8, 2009, 4 pages.

International Search Report of Counterpart PCT International Application No. PCT/GB2016/050659.

* cited by examiner

FORENSIC ANALYSIS

FIELD OF THE INVENTION

The present invention relates to a forensic analysis method performed on an endpoint device, such as a Personal Computer (PC), connected to a computer network. The present invention also relates to a computer program comprising instructions for causing an endpoint device to perform a forensic analysis method. The present invention further relates to a Distributed Computing System (DCS) which comprises plural endpoint devices and is configured to perform forensic analysis.

BACKGROUND ART

Locard's exchange principle holds that the perpetrator of a crime will bring something to a crime scene and will leave with something from the crime scene and that each act can yield forensic evidence. Forensic investigation therefore involves collection, preservation and analysis of evidence. This evidence is usually used in forensic analysis to either: prove or disprove assertions of whether or not a crime has been committed; or for audit, compliance and monitoring purposes. Although Digital Computing Systems (DCSs) process and store virtual material, or more specifically data in electronic form, and not physical material, Locard's exchange principle still holds true. Forensic investigation may be carried out on a DCS to detect suspect or anomalous behaviour in the DCS. Such suspect or anomalous behaviour may, for example, be caused by malware, a disgruntled employee, or human error. Forensic investigation may relate to an act of a criminal nature or may relate to a less extreme act which, nevertheless, infringes against regulations and policies, for example a fair IT usage policy, an information security policy or a law, such as a protection act. Forensic investigation in the present context, or alternatively digital forensics, is thus of wider applicability than conventional forensic investigation involving physical material.

The terms digital forensics, forensic investigation and forensic analysis, as used herein, are to be understood to refer to investigative or analytical activity relating to any endpoint device where an endpoint device is any apparatus that manipulates, stores or otherwise processes digital information and is connected to a computer network. By way of example, computers, mobile telephones, personal digital assistants, media players, set-top boxes, games consoles, televisions and associated network components, such as routers, switches, hubs, servers and broadcast equipment, are covered by the term endpoint device.

Every endpoint device creates, stores or manipulates digital information with such digital information forming the basis of digital evidence. An endpoint device typically creates a diverse range of data, further to the data familiar to the everyday user of the endpoint device. For example, for every text document created and saved to a hard disk or for every data packet routed to or from the endpoint device, a voluminous amount of data relating to such an activity may be created. Such data may be useful and can be used in one or more of a variety of ways from debugging to operation monitoring. Often all data created by an endpoint device is regarded as of possible relevance to a digital forensics investigation.

Suspect or anomalous behaviour in a DCS often involves communication over the computer network of files to or from an endpoint device. For example, an employee might operate the endpoint device to read confidential files by way of another endpoint device in the DCS. By way of a further example, malware running on the endpoint device might be operative to send an injurious file to at least one other endpoint device in the DCS. Patterns of network communication behaviour are therefore indicative of suspect or anomalous behaviour.

It is known to install dedicated hardware to monitor communication over the computer network of the DCS. However, this known approach involves cost in respect of the dedicated hardware, installation of the dedicated hardware, its integration with the DCS and continuous support and update of the software and hardware in use. Dedicated hardware is commonly known as "hardware proxy" wherein network traffic originating from or destined for an endpoint device is forcefully routed via such hardware. Dedicated hardware proxy usually inspects plain-text unencrypted traffic and performs decryption of encrypted traffic to effect monitoring. Decryption of encrypted traffic is performed via a hardware Man-In-The-Middle (MITM) attack in which certificates are substituted on the fly during a secure connection negotiation stage. MITM attacks are known to be controversial in the security community because such an attack may weaken client security defense by forcing a client to trust a globally untrustworthy Certificate Authority. It is known that MITM hardware can be exploited by an adversary, for example by gaining access to the private key of the untrustworthy Certificate Authority or by exploiting a weakness in the pre-installed software. Therefore, correct configuration, maintenance and constant updates are an integral part and unavoidable cost of using a hardware proxy.

Another known approach to examining network activity involves classifying or otherwise determining the content type of files communicated from or to an endpoint device, such as JPEG or HTML files, and comparing the determined content type with the like of a library of prohibited file content types. However, this known approach may be impracticable if the files are encrypted on the endpoint whereby the file content type is not evident. Furthermore, and irrespective of whether or not the files are encrypted, this approach imposes considerable computational and Input-Output (IO) burdens on the endpoint.

The present invention has been devised in the light of the inventors' appreciation of the aforementioned problems. It is therefore an object for the present invention to provide an improved forensic analysis method performed on an endpoint device connected to a computer network in which at least one file is conveyed to or from the endpoint device by way of the computer network.

It is a further object for the present invention to provide a Distributed Computing System (DCS) comprising plural endpoint devices and a computer network in which at least one endpoint device in the DCS is configured to perform an improved forensic analysis method.

STATEMENT OF INVENTION

According to a first aspect of the present invention there is provided a forensic analysis method performed in respect of an endpoint device connected to a computer network, the method comprising:
 collecting file system call data from the endpoint device, the file system call data corresponding to a plurality of system calls relating to file system operations arising from activity performed on the endpoint device;
 collecting network communication metadata from the endpoint device, the network communication metadata being based on a plurality of system calls relating to communication operations over the computer network arising from activity performed on the endpoint device;

detecting first candidate data comprised in one of the collected file system call data and the collected network communication metadata;

identifying second candidate data in the other of the collected file system call data and the collected network communication metadata, the second candidate data corresponding to the first candidate data; and analysing the second candidate data to determine whether or not the first and second candidate data correspond to suspect activity performed on the endpoint device.

The forensic analysis method is performed in respect of an endpoint device, such as a Personal Computer (PC), connected to a computer network. The forensic analysis method may be performed by electronic methods. The computer network may be comprised in a computer network arrangement in which plural PCs are in data communication with each other by way of the computer network. The computer network may therefore be a Distributed Computing System (DCS). The method comprises collecting file system call data from the endpoint device, the file system call data corresponding to a plurality of system calls (or alternatively syscalls) relating to file system operations arising from activity performed on the endpoint device. The method also comprises collecting network communication metadata from the endpoint device, the network communication metadata being based on a plurality of system calls relating to communication operations over the computer network arising from activity performed on the endpoint device. The network communication metadata may comprise process identifier, source IP/port identifier (or source IP address plus port identifier), protocol (e.g. TCP or UDP), protocol version (e.g. 4 or 6), timestamp and number of bytes transferred. Although the network communication metadata may lack identification of the name of system calls made by the application, the thread identifier, the user token and security context, the number of system calls may be evident from the network communication metadata. For example, a system call to transfer data to or receive data from the network may give rise to at least one network communication metadata event. Where a system call relates to a large file, there may be many corresponding network communication metadata events with each network communication metadata event relating to a different small part of the file. The method therefore comprises collecting system call data for file system operations and metadata for network communication operations in the endpoint device. The file system call data may correspond to a plurality of system calls relating to file system operations performed on the endpoint device.

The method further comprises detecting first candidate data comprised in one of the collected file system call data and the collected network communication metadata. The first candidate data may be detected in the collected system call data as described below. The method yet further comprises identifying second candidate data in the other of the collected file system call data and the collected network communication metadata, the second candidate data corresponding to the first candidate data. Furthermore, the method comprises analysing the second candidate data to determine whether or not the first and second candidate data correspond to suspect activity performed on the endpoint device. Determining whether or not the first and second candidate data correspond to suspect activity performed on the endpoint device may comprise analysing the first and the second candidate data. The method therefore provides for detection of events arising from suspect activity performed on the endpoint device in dependence on information comprised in both of the file system call data and the network communication metadata.

The method is operative, in contrast to one of the known approaches, in dependence on system call data which may be collected without the use of dedicated hardware. Furthermore, the method may be operative on system call data and not the content of files which are the object of system calls. The method is thus operative on metadata rather than file content per se. The method may be operative on metadata which is independent of file content and may not be operative on metadata which is dependent on file content. Metadata which is dependent on file content may comprise file type data. Therefore and in contrast to the other known approach, there is no need to read a file or otherwise determine the content of a file. The method may therefore not comprise examination of file data per se.

The step of detecting first candidate data comprised in one of the collected file system call data and the collected network communication metadata may comprise comparing at least one characteristic of the collected system call data with at least one predetermined characteristic and more specifically at least one predetermined characteristic of network communication metadata. The at least one predetermined characteristic may be indicative of suspect activity being performed on the endpoint device. The step may further comprise detecting the first candidate data in dependence on the comparison of the at least one characteristic of the collected system call data with the at least one predetermined characteristic. The first candidate data may be detected, for example, in dependence on a match between the at least one characteristic of the collected system call data and the at least one predetermined characteristic. Characteristics of system call data are described further below.

The step of detecting first candidate data comprised in one of the collected file system call data and the collected network communication metadata may comprise detecting first candidate data comprised in the collected network communication metadata. The step of identifying second candidate data in the other of the collected file system call data and the collected network communication metadata may therefore comprise identifying second candidate data in the collected file system call data. Analysis of candidate data to determine whether or not the candidate data corresponds to suspect activity may therefore be initiated by detection of first candidate data comprised in the collected network communication metadata.

The step of detecting first candidate data comprised in the collected network communication metadata may comprise determining a number of communication system calls to a particular network node in the computer network. The number of communication system calls to a particular network node may be determined within a predetermined time window. The predetermined time window may be moving. Alternatively or in addition, detection may depend on an amount of data involved in at least one communication system call. Alternatively or in addition, detection may further depend on a communication not being effected by a predetermined source, such as the operating system or a security program. More specifically, system call data arising from operation of such a predetermined source may be excluded from detection. The step of determining a number of communication system calls to a particular network node may comprise determining a number of communication system calls to a network address of a DCS comprising the computer network. The method may therefore comprise determining a number of communication system calls to a network address characterised by an IP address and a port number. The method may further comprise determining if the number of communication system calls to the particular network node is greater than a predetermined number, such as more than two. Repetition of system calls to a particular network node may be indicative of suspect behaviour. Where detection depends on amount of data, sending or receiving individual network packets of more than predetermined size, for example more than 1 Kilobyte, may be indicative of a file transfer operation. Detection of a spike in a number of communication system calls to a particular address along with large network packet size within a predetermined time period, such within milliseconds or within seconds in respect of network packet time spacing, may be indicative to a relatively high degree of confidence that a file has been uploaded or downloaded.

The step of identifying second candidate data corresponding to the first candidate data may comprise identifying the second candidate data in dependence on proximity and more specifically proximity in time of the first and second candidate data. Where each system call data comprises a time element, identification may be made when the time elements are within a predetermined time of each other, such as 500 ms. The predetermined time may be longer than 500 ms if the operating system of the endpoint device is under heavy load whereby network events or file system events are received subject to delay. In such circumstances, the predetermined time may be increased to several seconds. Alternatively or in addition, where each system call data comprises a process identifier (PID), identification may be made when the respective PIDS are the same. Alternatively or in addition, where each system call data comprises a process name, identification may be made when the respective process names are the same.

The step of analysing the second candidate data may comprise comparing at least one characteristic of the second candidate data with at least one predetermined characteristic and more specifically at least one predetermined characteristic of file system call data. The at least one predetermined characteristic of file system call data may be indicative of suspect activity being performed on the endpoint device. The at least one characteristic may comprise at least one file command and more specifically at least one file command comprised in the file system call data. The at least one file command may comprise at least one of: file create; file read; file write; file delete; file rename; and file move. Analysis may comprise determining there is a match between the second candidate data and the at least one predetermined characteristic of file system call data. For example, the second candidate data may comprise a file read command and a file move command and the at least one predetermined characteristic of file system call data consists of file create, file read, file write, file delete, file rename and file move commands. Comparison and matching may determine that file commands comprised in the second candidate data are comprised in the at least one predetermined characteristic of file system call data.

The step of detecting first candidate data may provide for a first form of indication of suspect activity being performed on the endpoint device and more specifically indication of suspect activity being performed on the endpoint device in respect of network communication activity. The step of analysing second candidate data may provide for a second form of indication of suspect activity being performed on the endpoint device and more specifically indication of suspect activity being performed on the endpoint device in respect of file activity. In view of their different perspectives of computer activity, a stronger indication of suspect activity being performed on the endpoint device may be provided when the step of detecting first candidate data is combined with the step of analysing second candidate data.

The method may further comprise identifying an event in dependence on the step of analysing the second candidate system call data. The event may be one of a file upload and a file download event. Identifying the event may comprise recording data pertaining to the event. The data pertaining to the event may comprise data comprised in the first candidate system call data and data comprised in the second candidate system call data. More specifically, the data pertaining to the event may comprise at least one of: date and time; machine identifier; username; application identifier; activity identifier; and resource identifier. The resource identifier may comprise at least one of a file name and database query.

After the step of identifying an event, the method may comprise providing at least one file which is the object of the identified event, e.g. the resource. In addition, the at least one file may be stored. The content of the at least one file may be determined. The content of the at least one file may be determined when the file is unencrypted. Determining the content of a file at this stage may impose considerably less of a computational and input/output burden than determining file content on an ongoing basis before detection of suspect activity according to the present invention. The content of the at least one file which is the object of the identified collected file system call data may be determined locally to or at a location remote from the endpoint device. More specifically the content of the at least one file which is the object of the identified collected file system call data may be determined in a central endpoint device, such as a central server, which is in communication with the endpoint device by way of the computer network.

Before the step of storing at least one file which is the object of the identified event, the method may further comprise retrieving the at least one file in dependence on the candidate data. For example, the at least one file may be retrieved in dependence on a resource identifier. The file may be stored on another endpoint device in the network with the candidate data being operative to address the file. Where the file is stored locally, i.e. on the endpoint device operative to collect the file system call data and the network communication metadata, the file may be retrieved and stored locally. Where the file is stored on another endpoint device, the file may be retrieved and stored locally. In addition, and further to storage of the file on the endpoint device according to the present method, the file may be transferred to a remote endpoint. Furthermore, the file may be transferred with data relating to the file comprised in the candidate data. Further analysis may be carried out on the remote endpoint. Alternatively or in addition, further analysis may be carried out on a distributed basis on plural endpoints. Each of the plural endpoints may be operative in respect of a respective different part of the further analysis.

There may be events of a certain nature which do not arise from suspect activity on the endpoint device but which are liable to be detected as arising from suspect activity. For example, such events may comprise native operating system activity, such as reading of configuration files in one thread and sending data over the network in another thread at the same time within the same process or downloading or uploading temporary files which are created by browsers to sandbox file content and run malware analytics. Alternatively, there may be events which are superfluous to detection of suspect activity. More specifically a suspect event may be repeated with the second and further suspect events being superfluous. The method may therefore further comprise filtering at least one of the collected file system call data and the collected network communication metadata. Filtering may be done before the steps of identifying the first candidate data and detecting the second candidate data. Alternatively or in addition, the method may further comprise filtering at least one of the first candidate data and the second candidate data. Filtering may be done before the step of analysing the second candidate data. Filtering in respect of repetition may be done within a predetermined period, i.e. within a moving time window, such as of five minutes, whereby an event reoccurring within the predetermined period is not processed according to the present method.

Each of the file system call data and the network communication metadata may be collected from the endpoint device and stored in the endpoint device. Each of the file system call data and the network communication metadata may be stored in the endpoint device for a predetermined period of time. The system call data may be stored for at most 10 seconds. Alternatively or in addition the endpoint device may comprise data storage of predetermined size. The data storage of predetermined size may be configured as a first in, first out (FIFO) buffer.

At least one of the file system call data and the network communication metadata may be collected by a collection tool at an interface between a kernel and a user space of the endpoint device. The collection tool may be operative to intercept system calls. More specifically, the file system call data may be collected by a software wrapper that intercepts or receives notifications about system calls made by any program running in the kernel and the user space. More specifically, the software wrapper may be a file system mini-filter driver on Windows, kprob mechanism or system call table hooks on Linux flavours. The specific means of collecting system call information may depend on the operating system and version of the kernel. The collection tool may be operative to trace network communication activity and thereby provide a trace of the network communication activity in the form of network communication metadata. The network communication metadata may be collected by an operating system network activity monitor. The network communication metadata may be received from Network Layer 3 (IP address) and Transport Layer 4 (TCP & UDP). For example, the operating system network activity monitor may be Event Tracing for Windows or perf_events or LTTng on Linux.

The endpoint device may be configured such that the endpoint device comprises one of a monolithic kernel and hybrid kernel. The kernel may comprise the transport layer. The like of the TCP protocol and the UDP protocol may therefore be comprised in the kernel.

The computer network may comprise at least one of: a wired link, such as an electrical conduit; optical fibre; and a wireless link. The computer network may thus be of conventional form and function. Alternatively, the computer network may be constituted at least in part by at least two processes running on the endpoint device, the processes communicating with each other by way of a network method, such as network sockets or network pipes. The present method may therefore be operative in respect of communication over a computer network comprised in the endpoint device.

The method may comprise providing an output in dependence on the step of identifying an event. The output may be provided by way of an output device. The output may comprise a human perceptible indication that suspect activity has been performed on the endpoint device. Providing an output may comprise at least one of: operation of an output device, such as providing a message on a video display unit or on hardcopy produced by the like of a printer; and storing data in data storage, such as in a log file or a database.

According to a second aspect of the present invention there is provided a computer program comprising instructions for causing an endpoint device to perform the method according to the first aspect of the present invention.

The computer program may be at least one of: embodied on a record medium; embodied in read only memory; stored in computer memory; and carried on an electrical carrier signal. The computer program may be stored in a non-transitory medium for storing data for access by an application program being executed on an endpoint device.

Further embodiments of the second aspect of the present invention may comprise one or more further features of the first aspect of the present invention.

According to a third aspect of the present invention there is provided a Distributed Computing System (DCS) configured to perform forensic analysis in accordance with the first aspect of the present invention.

The DCS may comprise plural endpoint devices and the computer network, the DCS being configured to provide for data communication between endpoint devices comprised in the DCS. Each of plural endpoint devices comprised in the DCS may be configured to perform forensic analysis in accordance with the first aspect of the present invention.

Further embodiments of the third aspect of the present invention may comprise one or more features of the first aspect of the present invention.

According to a further aspect of the present invention there is provided a forensic analysis method performed in respect of an endpoint device connected to a computer network, the method comprising: collecting file system call data from the endpoint device; collecting data relating to network communication from the endpoint device; detecting first candidate data comprised in one of the collected file system call data and the collected network communication data; identifying second candidate data in the other of the collected file system call data and the collected network communication data, the second candidate data corresponding to the first candidate data; and analysing the second candidate data to determine whether or not the first and second candidate data correspond to suspect activity performed on the endpoint device. Embodiments of the further aspect of the present invention may comprise one or more features of any previous aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1:
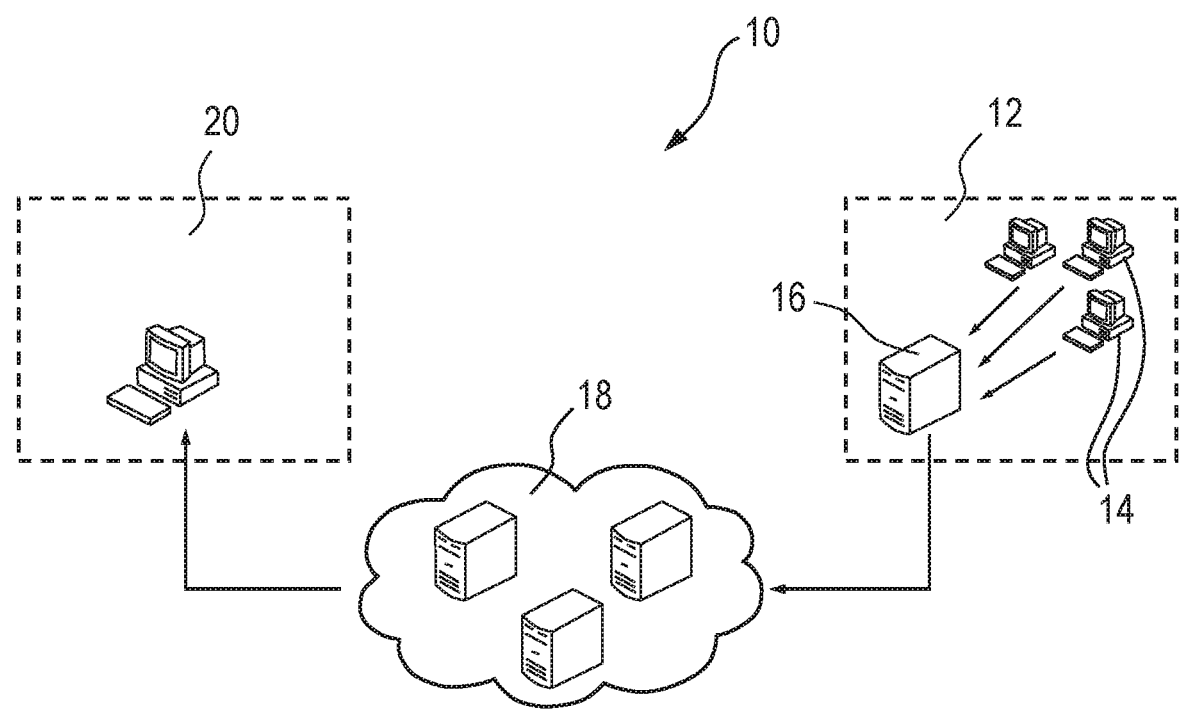
FIG. 1 is representation of a Digital Computing System (DCS) according to an embodiment of the present invention.

A representation of a Digital Computing System (DCS) 10 according to an embodiment of the present invention is shown in FIG. 1. More specifically FIG. 1 shows a clustered service oriented architecture (SOA). The DCS 10 of FIG. 1 comprises a host organisation 12 which in turn comprises plural client machines 14 (which each constitute an endpoint device), which are each operative in accordance with the present invention, and a buffer computer 16. Data collected from each client machine 14 for further analysis is conveyed over a network to the buffer computer 16. The buffer computer 16 is operative to receive and coordinate data received from the client machines 14 and to convey the data over a network to a cluster 18 (which constitutes a central endpoint device) comprised in the DCS 10. The cluster 18, which comprises at least one server and often plural servers, is physically and logically independent of the host organisation 12 and is hosted within or outside the host organisation 12. According to a first approach, further analysis and supervisory operations are performed in the cluster 18. According to a second approach, an external party computer 20 (which constitutes a central endpoint device) is operative to receive data from the cluster 18 and to perform further analysis and supervisory operations. Communication of data between the external party computer 20 and the cluster 18 is by way of a network such as an Internet link.

Figure 2:
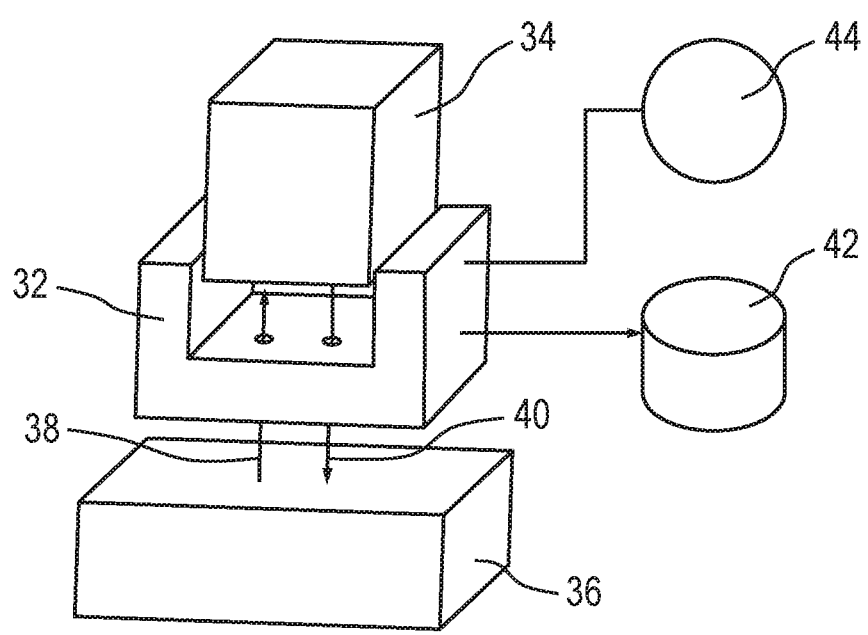
FIG. 2 represents the collection of system call data from an endpoint device comprised in the DCS of FIG. 1.

The collection of file system call data and network communication metadata from each client machine 14 of the DCS 10 of FIG. 1 is represented in FIG. 2. Collection of file system call data from each client machine is by way of a first collection tool 32. File system call data arising from any program is collected whereby the present method is not limited to file system call data arising from browser and email programs. Where the operating system is Windows, the first collection tool 32 is a file system mini-filter driver. Where the operating system is Linux, the first collection tool 32 is a kprob mechanism or system call table hooks. The first collection tool 32 in effect sits between the user space 34 and the kernel space 36 of a client machine 14. All system calls 38, 40 between the user space 34 and the kernel space 36 are intercepted by the first collection tool 32 with file system calls being filtered by the first collection tool before being stored in data storage 42. The data storage 42 is comprised in a hard disk of the DCS 10 or in another suitable memory arrangement local to or comprised in the client machine 14. The collection of network communication metadata, such as TCP/IP or UDP/IP, from each client machine is by way of a second collection tool 44 and is irrespective of whether the data is encrypted or unencrypted. The second collection tool 44 is operative to trace networking system calls between the user space 34 and the kernel space 36 and also other operating system operations such as memory allocation/deallocation, CPU utilisation, etc. Where the operating system is Windows, the second collection tool 44 is Event Tracing for Windows. Where the operating system is Linux, the second collection tool 44 is perf_events or LTTng. The second collection tool 44 is operative to collect data in respect of communication of the client machine 14 with another endpoint device. The second collection tool 44 is also operative to collect data in respect of communication within the client machine 14 by way of a network method such as network sockets or network pipes.

Figure 3:
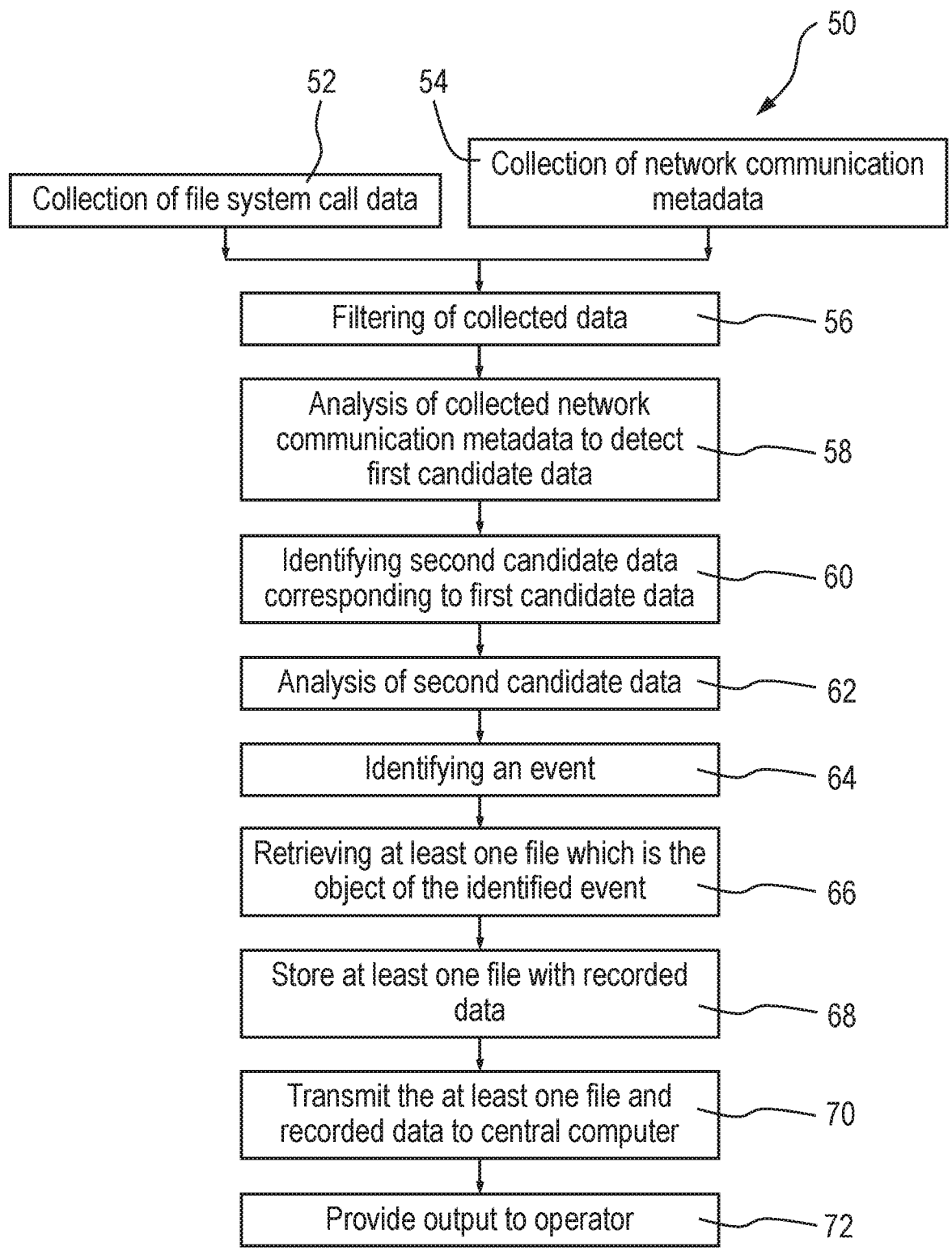
FIG. 3 shows a flow chart representing operation according to an embodiment of the present invention.

A forensic analysis method according to the present invention will now be described with reference to the flow chart 50 of FIG. 3. File system call data is collected 52 by way of the first collection tool 32. Network communication metadata is collected 54 by way of the second collection tool 44. The file system call data and the network communication metadata are collected simultaneously. As mentioned above, the first collection tool 32 is operative to filter file system calls. Each of the first collection tool 32 and the second collection tool 44 is operative to filter system call data 56 relating to activities which are known not to arise from suspect behaviour, such as from native operating system activity or a security program. The collected system call data is stored locally to the client machine 14 for a predetermined time, such as 10 seconds, in a respective buffer arrangement. Older data in each of the two buffer arrangements is removed in batches of data to reduce processing overhead. The collected and stored network communication metadata is then analysed to detect first candidate data 58. Analysis to detect first candidate data comprises determining a number of communication system calls to one of plural predetermined different network addresses within a predetermined time window. Each network address is characterised by an IP address and a port number. If the number of communication system calls to a predetermined network address is greater than a predetermined number, such as two, the system call data is flagged. Where network communication involves transfer of data, analysis to detect first candidate data further comprises determining an amount of data involved in network communication and if the amount of data exceeds a predetermined threshold, such as 1 Kbyte, further flagging the system call data. Determining an amount of data involved comprises determining packet size and usually size of plural packets in view of data being broken into plural smaller packets. The size of data in each packet is evident from the network communication metadata. Alternatively when data transfer involving the data being spread over plural packets is complete, the file containing the transferred data is queried to determine its data size. Repeated system calls to a particular network address within a predetermined period of milliseconds with an amount of data involved exceeding a 1 Kbyte or repeated system calls to a particular network address within a predetermined period of seconds with an amount of data involved exceeding a 1 Kbyte where such data is comprised in plural network packets results in identifying the network communication metadata in question as first candidate data.

The method then comprises identifying second candidate data in the stored file system call data which corresponds to the first candidate data 60. The corresponding second candidate data is identified by way of matching the process identifier (PID) of the first candidate data with the PID of the system call data comprised in the stored file system call data. Alternatively, matching is done by way of process name. Alternatively, matching is done by way of date and time data comprised in the first candidate data and the stored file system call data. More specifically, there is a match when the respective time elements are within a predetermined time of each other, such as 500 ms when there is no undue latency or up to several seconds if the operating system of the client machine 14 is under heavy load whereby network events or file system events are subject to delay.

The method then comprises analysing the second candidate data 62. Analysing the second candidate data comprises comparing a file command comprised in the second candidate data with plural predetermined file commands such as file create, file read, file write, file delete, file rename and file move to determine whether or not there is a match between the file command comprised in the second candidate data and one of the plural predetermined file commands. Thereafter and following matching of file commands, the method further comprises identifying an event, such as a file upload or a file download, in dependence on the first and second candidate data 64. Event identification comprises recording data comprised in the first and second candidate data. The recorded data comprises: date and time; machine identifier;

username; application identifier; activity identifier; and resource identifier. The method comprises filtering in respect of repetition of an event. Filtering in respect of repetition is done within a predetermined period, i.e. within a moving time window, such as of five minutes, whereby an event reoccurring within the predetermined period is not processed. Filtering in respect of repetition comprises forming a hash of the first instance of an event and putting the hash in a hash table with the entry having the hash as the key and the time of the event as the value. For each subsequent event, its hash is formed and compared with the content of the hash table. If the formed hash is present as a key in the hash table, the subsequent event is ignored. If the formed hash is not present as a key in the hash table, a new entry is created in the hash table as per the first instance of an event. Older entries, i.e. entries outside the moving time window, are deleted periodically from the hash table.

The method then comprises retrieving at least one file which is the object of the identified event by way of the resource identifier 66. The at least one file may be local to or remote from the client machine 14. After it is retrieved, the at least one file is stored locally to the client machine 14 with the recorded data from the first and second candidate data 68. The at least one file and the recorded data are then transmitted to the cluster 18 or the external party computer 20 where the content of the at least one file is determined 70. In another approach, the content of the at least one file is determined in the client machine 14 before the at least one file and the recorded data are transmitted to the cluster 18 or the external party computer 20. Further analysis and processing of received files and recorded data are carried out on the cluster 18 or the external party computer 20. Further analysis and processing involves the like of statistical analysis and comparison with rules concerning permitted and prohibited activities.

The method also comprises providing an output to an operator of the cluster 18 or the external party computer 20 that a suspect event has been detected 72. The output is provided by way of one or more of: operation of an output device, such as providing a message on a video display unit or on hardcopy produced by the like of a printer; and storing data in data storage, such as in a log file or a database.

An example of first candidate data, i.e. data detected from the collected communication metadata, second candidate data, i.e. data identified from file system call data, and a file upload event identified in dependence on the first and second candidate data is provided below.

pid—process id
d—date time
m—machine id
u—domain and user name
ap—application
ac—activity
r—resource (file)
fp—file path—string
fs—file size in bytes—long (no quotes)
ts—transfer size in bytes—long (no quotes)
sip—source IP address (ip4 or ip6)—string
sp—source port—int
dip—destination IP address (ip4 or ip6)—string
dp—source port—int
dh—destination host—string
p—protocol [tcp-ip-4, tcp-ip-6, udp-ip-4, udp-ip-6]—string First candidate data

```
{
    "pid":  "1234",
    "d":    "2016-02-01T13:15:30.123Z"
    "m":    "j9E",
    "ap":   "application.exe",
    "ac":   "data received",
    "ts":   12345,
    "sip":  "10.1.1.35",
    "sp":   4523,
    "dip":  "123.123.123.123",
    "dp":   433,
    "dh":   "example.com",
    "p":    "tcp-ip-4"
}
```

Second candidate data

```
{
    "pid":  "1234",
    "d":    "2016-02-01T13:15:30.123Z",
    "m":    "j9E",
    "u":    "companydomain_username",
    "ap":   "application.exe",
    "ac":   "file read",
    "r":    "c:\temp\file.doc"
}
```

Identified file upload event

```
{
    "d":"2016-02-01T13:15:30.123Z",
    "m":"j9E",
    "u":"zonefox-hq_oleksii",
    "ap":"application.exe",
    "ac":"file uploaded",
    "r": "c:\temp\foo.txt -> tcp://example.com:443",
    "mn": {
        "fp": "c:\temp\foo.txt",
        "fs": 1235,
        "ts": 1235,
        "sip": "10.1.1.35",
        "sp": 4523,
        "dip": "123.123.123.123",
        "dp": 443,
        "dh": "example.com",
        "p": "tcp-ip-4"
    }
}
```

The invention claimed is:

1. A forensic analysis method performed in respect of an endpoint device connected to a computer network, the method comprising:
    collecting file system call data from the endpoint device, the file system call data corresponding to a plurality of system calls relating to file system operations arising from activity performed on the endpoint device, wherein the file system call data is collected by a software wrapper that intercepts or receives notifications about system calls made by any program running in a kernel or a user space of the endpoint device;
    collecting network communication metadata from the endpoint device, the network communication metadata being based on a plurality of system calls relating to communication operations over the computer network arising from activity performed on the endpoint device, wherein the network communication metadata is collected by an operating system network activity monitor;

detecting first candidate data comprised in the collected network communication metadata by determining a number of communication system calls to a particular network node in the computer network within a predetermined time window and determining whether the number of communication system calls to the particular network node is greater than a predetermined number;

identifying second candidate data in the collected file system call data, the second candidate data corresponding to the first candidate data by:
  when each file system call data comprises a time element and each network communication metadata comprises a timestamp, identifying the second candidate data based on the time element and the timestamp being within a predetermined time of each other; and
  when each file system call data comprises a first process identifier and the network communication metadata comprises a second process identifier,
  identifying the second candidate data based on the first process identifier and the second process identifier being the same; and
  analyzing the second candidate data to determine whether or not the first and second candidate data correspond to suspect activity performed on the endpoint device.

2. The forensic analysis method according to claim 1 wherein the network communication metadata comprises process identifier, source IP/port identifier, protocol, protocol version, timestamp and number of bytes transferred.

3. The forensic analysis method according to claim 1 wherein said detecting first candidate data includes comparing at least one characteristic of the collected system call data with at least one predetermined characteristic of network communication metadata, the at least one predetermined characteristic being indicative of suspect activity being performed on the endpoint device.

4. The forensic analysis method according to claim 1 wherein said detecting first candidate data comprised in the collected network communication metadata depends on an amount of data involved in at least one communication system call.

5. The forensic analysis method according to claim 1 wherein each system call data comprises a first process name and the network communication metadata comprises a second process name and wherein the step of identifying second candidate data corresponding to the first candidate data comprises identifying the second candidate data in dependence on the first and second process names are the same.

6. The forensic analysis method according to claim 1 wherein the second candidate data is identified in the collected file system call data and said analyzing the second candidate data comprises: comparing at least one characteristic of the second candidate data with at least one predetermined characteristic of file system call data, the at least one predetermined characteristic of file system call data being indicative of suspect activity being performed on the endpoint device; and determining if there is a match between the compared second candidate data and the at least one predetermined characteristic of file system call data.

7. The forensic analysis method according to claim 6 wherein the at least one characteristic comprises at least one file command comprised in the file system call data.

8. The forensic analysis method according to claim 7 wherein the at least one file command comprises at least one of: file create; file read; file write; file delete; file rename; and file move.

9. The forensic analysis method according to claim 1 further comprising identifying an event based on said analyzing the second candidate system call data, the event being one of a file upload event and a file download event.

10. The forensic analysis method according to claim 9 wherein identifying the event comprises recording data pertaining to the event, the data pertaining to the event comprising at least one of: date and time; machine identifier; username; application identifier; activity identifier; and resource identifier.

11. The forensic analysis method according to claim 9 further comprising retrieving at least one file that is the object of the identified event, the at least one file being retrieved in dependence on at least one of the first and second candidate data.

12. The forensic analysis method according to claim 1 further comprising storing each of the collected file system call data and the collected network communication metadata in the endpoint device by way of at least one of: for a predetermined period; and in data storage of predetermined size.

13. The forensic analysis method according to claim 1 wherein at least one of the file system call data and the network communication metadata is collected at an interface between the kernel and the user space.

14. A non-transitory medium that stores executable program instructions for causing an endpoint device to perform a method comprising:
  collecting file system call data from the endpoint device, the file system call data corresponding to a plurality of system calls relating to file system operations arising from activity performed on the endpoint device, wherein the file system call data is collected by a software wrapper that intercepts or receives notifications about system calls made by any program running in a kernel or a user space of the endpoint device;
  collecting network communication metadata from the endpoint device, the network communication metadata being based on a plurality of system calls relating to communication operations over the computer network arising from activity performed on the endpoint device, wherein the network communication metadata is collected by an operating system network activity monitor;
  detecting first candidate data comprised in the collected network communication metadata by determining a number of communication system calls to a particular network node in the computer network within a predetermined time window and determining whether the number of communication system calls to the particular network node is greater than a predetermined number;
  identifying second candidate data in the collected file system call data, the second candidate data corresponding to the first candidate data by:
    when each file system call data comprises a time element and each network communication metadata comprises a timestamp, identifying the second candidate data based on the time element and the timestamp being within a predetermined time of each other; and
    when each file system call data comprises a first process identifier and the network communication metadata comprises a second process identifier,
    identifying the second candidate data based on the first process identifier and the second process identifier being the same; and analyzing the second candidate data to determine whether or not the first and second candidate data correspond to suspect activity performed on the endpoint device.

15. The non-transitory medium of claim 14, wherein the network communication metadata comprises process identifier, source IP/port identifier, protocol, protocol version, timestamp and number of bytes transferred.

16. The non-transitory medium of claim 14, wherein said detecting first candidate data includes comparing at least one characteristic of the collected system call data with at least one predetermined characteristic of network communication metadata, the at least one predetermined characteristic being indicative of suspect activity being performed on the endpoint device.

17. The non-transitory medium of claim 14, wherein said detecting first candidate data comprised in the collected network communication metadata depends on an amount of data involved in at least one communication system call.

18. The non-transitory medium of claim 14, wherein each system call data comprises a first process name and the network communication metadata comprises a second process name and wherein the step of identifying second candidate data corresponding to the first candidate data comprises identifying the second candidate data in dependence on the first and second process names are the same.

19. The non-transitory medium of claim 14, wherein the second candidate data is identified in the collected file system call data and said analyzing the second candidate data comprises: comparing at least one characteristic of the second candidate data with at least one predetermined characteristic of file system call data, the at least one predetermined characteristic of file system call data being indicative of suspect activity being performed on the endpoint device; and determining if there is a match between the compared second candidate data and the at least one predetermined characteristic of file system call data.

20. The non-transitory medium of claim 19, wherein the at least one characteristic comprises at least one file command comprised in the file system call data.

21. The non-transitory medium of claim 20, wherein the at least one file command comprises at least one of: file create; file read; file write; file delete; file rename; and file move.

22. The non-transitory medium of claim 14, wherein the method further comprises identifying an event based on said analyzing the second candidate system call data, the event being one of a file upload event and a file download event.

23. The non-transitory medium of claim 22, wherein identifying the event comprises recording data pertaining to the event, the data pertaining to the event comprising at least one of: date and time; machine identifier; username; application identifier; activity identifier; and resource identifier.

24. The non-transitory medium of claim 22, wherein the method further comprises retrieving at least one file that is the object of the identified event, the at least one file being retrieved in dependence on at least one of the first and second candidate data.

25. The non-transitory medium of claim 14, wherein the method further comprises storing each of the collected file system call data and the collected network communication metadata in the endpoint device by way of at least one of: for a predetermined period; and in data storage of predetermined size.

26. The non-transitory medium of claim 14, wherein at least one of the file system call data and the network communication metadata is collected at an interface between the kernel and the user space.

* * * * *